US008533465B2

(12) United States Patent
Trostle

(10) Patent No.: US 8,533,465 B2
(45) Date of Patent: Sep. 10, 2013

(54) SYSTEM AND METHOD OF ENCRYPTING NETWORK ADDRESS FOR ANONYMITY AND PREVENTING DATA EXFILTRATION

(75) Inventor: Jonathan T. Trostle, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 1043 days.

(21) Appl. No.: 12/398,464

(22) Filed: Mar. 5, 2009

(65) Prior Publication Data
US 2009/0228708 A1 Sep. 10, 2009

Related U.S. Application Data

(60) Provisional application No. 61/033,818, filed on Mar. 5, 2008.

(51) Int. Cl.
*H04L 29/06* (2006.01)
*G06F 7/04* (2006.01)
*G06F 15/16* (2006.01)
*G06F 17/30* (2006.01)

(52) U.S. Cl.
USPC ........... 713/162; 713/168; 709/225; 709/229; 726/2; 726/3

(58) Field of Classification Search
USPC ................................. 713/168, 200
See application file for complete search history.

(56) References Cited

U.S. PATENT DOCUMENTS

| | | | |
|---|---|---|---|
| 6,957,346 B1 * | 10/2005 | Kivinen et al. | 713/153 |
| 7,043,633 B1 | 5/2006 | Fink et al. | |
| 7,065,647 B2 * | 6/2006 | Funahashi | 713/168 |
| 7,086,086 B2 | 8/2006 | Ellis | |
| 7,234,059 B1 | 6/2007 | Beaver et al. | |
| 7,246,231 B2 | 7/2007 | Tariq et al. | |
| 7,333,461 B2 | 2/2008 | Thubert et al. | |
| 7,409,544 B2 | 8/2008 | Aura | |
| 2003/0233540 A1 * | 12/2003 | Banerjee et al. | 713/153 |

(Continued)

*Primary Examiner* — Shin-Hon Chen
(74) *Attorney, Agent, or Firm* — Aisha Ahmad

(57) ABSTRACT

A method is provided for sending a data packet from a client through a network and to a server. The data packet is a data structure having an originating address portion and destination address portion. The network includes a first mix router and a second mix router. The client has a client address, whereas the first mix router has a first mix router address, the second mix router has a second mix router address and the server has a server address. The method includes encrypting the originating address portion of the data packet and encrypting the destination portion of the data packet, transmitting the encrypted data packet, decrypting the originating address portion of the encrypted data packet and the destination portion of the encrypted data packet, providing a first data packet and providing a second data packet. Specifically, the encrypting the originating address portion of the data packet is based on the client address and the encrypting the destination portion of the data packet is based on one of the first mix router address and the second mix router address. The encrypting generates an encrypted data packet. The encrypted data packet is transmitted to the one of the first mix router and the second mix router, wherein it is decrypted to generate a decrypted data packet. The first data packet is based on the decrypted data packet and is provided to the other of the first mix router and the second mix router. The second data packet is provided to the server.

20 Claims, 4 Drawing Sheets

(56) References Cited

U.S. PATENT DOCUMENTS

| | | |
|---|---|---|
| 2004/0236937 A1 | 11/2004 | Perkins et al. |
| 2004/0240669 A1 | 12/2004 | Kempf et al. |
| 2005/0041675 A1 | 2/2005 | Trostle et al. |
| 2005/0172120 A1 | 8/2005 | Wang et al. |
| 2007/0113075 A1 | 5/2007 | Jo et al. |
| 2007/0260884 A1 | 11/2007 | Venkitaraman et al. |

* cited by examiner

SYSTEM AND METHOD OF ENCRYPTING NETWORK ADDRESS FOR ANONYMITY AND PREVENTING DATA EXFILTRATION

The present application claims benefit under 35 U.S.C. §119 (e) to U.S. provisional patent application 61/033,818, filed Mar. 5, 2008, the entire disclosure of which is incorporated herein by reference.

BACKGROUND

Network security consists of the provisions made in an underlying computer network infrastructure, policies adopted by the network administrator to protect the network and the network related resources from unauthorized access combined with consistent and continuous monitoring and measurement of effectiveness. Two existing network security challenges include ensuring anonymous communications and preventing unwanted data dissemination from a network, i.e., data exfiltration.

Ensuring anonymous communications will be described first. Assume a web client communicates with a web server, and the client wishes to be anonymous. The client might choose to use a real-time anonymity system, such as Tor or a Peer-to-Peer (P2P) anonymity system. Tor is a free software implementation of second-generation onion routing. Tor helps a network user defend against traffic analysis by bouncing their communications around a distributed network of relays run by volunteers all around the world. A P2P anonymity system is an anonymous Internet Protocol (IP) network overlay that uses layered encryption and multi-hop routing, as will be discussed in more detail below with reference to FIG. 1.

FIG. 1 illustrates a communication network that employs a conventional P2P anonymity system. In the figure, communication network 100 includes a client 102, a server 104, a mix router circuit 106 and an eavesdropper 108. In this example, mix router circuit 106 includes mix router 110, mix router 112, mix router 114 and mix router 116. For illustrative purposes, client 102 is depicted as including a Network Address Translator (NAT) 118. Typically a NAT would be deployed somewhere near the firewall on the entry/exit point for network traffic flowing into and out of an organization's network. To those of skill in the art, NAT refers to a standardized network address translation algorithm. For example, although Tor uses different addresses between each pair of mix routers, Tor would not be considered a NAT because it has a different algorithm.

Each of client 102, mix router 110, mix router 112, mix router 114, mix router 116 and server 104 may be any known type of data processing system that is operable to perform functions. These functions may be performed based on instructions that may be stored each device, respectively, or may be stored on a data processing system readable medium that is accessible by each device, respectively.

Client 102 is operable to send data 120 to plurality of mix routers 106 and to receive data 122 from mix router circuit 106. Server 104 is operable to receive data 124 from mix router circuit 106 and to send data 126 to mix router circuit 106. Eavesdropper 108 is operable to, at least, receive data 128 from mix router circuit 106. Mix router 110 is operable to send data 130 to mix router 112, to send data 132 to mix router 116 and to send data 134 to mix router 114. Mix router 112 is operable to send data 136 to mix router 110, to send data 138 to mix router 114 and to send data 140 to mix router 116. Mix router 114 is operable to send data 142 to mix router 112, to send data 144 to mix router 116 and to send data 144 to mix router 110. Mix router 116 is operable to send data 148 to mix router 114, to send data 150 to mix router 110 and to send data 152 to mix router 112. Any one of mix router 110, mix router 112, mix router 114 and mix router 116 is additionally operable to receive data 120 from client 102, to receive data 126 from server 104, to transmit data 122 to client 102 or to transmit data 124 to server 104.

NAT 118 is used to bridge between client 102 and oblivious server 104. In other words, server 104 does not know the identity of client 102. In an attempt to maintain such anonymity, client 102 encrypts data 120 for transmission through mix router circuit 106. The last mix router ultimately forwards data from client 102 to server 104. The reverse communication data are sent back through the same mix routers, in reverse order. Ideally, at each mix router, an adversary is unable to determine which outgoing packet corresponds to a given incoming packet. A common technique to this end is to have client 102 multiply encrypt data it sends and then have each mix router decrypt one layer of the encryption (similar to peeling an onion). One example of such transmission will now be described below.

To maintain anonymity from server 104, client 102 transmits data 120 through a pseudo-random pathway within mix router circuit 106. When encrypting data 120, NAT 118 provides an encryption level for each leg of the transmission such that an originating address is pseudo-randomly mapped to a destination address. In this example, presume that NAT 118 encrypts data 120, such that data 120 will transmit along a data path: from client 102 to mix router 112; from mix router 112 to mix router 110; from mix router 110 to mix router 114; from mix router 114 to mix router 116; and then from mix router 116 to server 104.

Therefore, when encrypting data 120, NAT 118 provides four encryptions for data 120, the first encryption of which includes a first destination address as mix router 112. Upon receipt of data 120, mix router 112 decrypts the first level of encryption, which then maps the originating address of client 102 to destination address of mix router 110. Because data 120 has been decrypted by mix router 112, data 120 is transformed into data 136.

Upon receipt of data 136, mix router 110 decrypts the second level of encryption, which then maps the originating address of mix router 112 to destination address of mix router 114. Because data 136 has been decrypted by mix router 110, data 136 is transformed into data 134.

Upon receipt of data 134, mix router 114 decrypts the third level of encryption, which then maps the originating address of mix router 110 to destination address of mix router 116. Because data 134 has been decrypted by mix router 114, data 134 is transformed into data 144.

Upon receipt of data 144, mix router 116 decrypts the fourth and final level of encryption, which then maps the originating address of mix router 114 to destination address of server 104. Because data 144 has been decrypted by mix router 116, data 144 is transformed into data 124.

As discussed by example above, data 120 from client 102 is multiply encrypted by NAT 118, and decrypted once by each of mix routers 110, 112, 114 and 116. All traffic between client 102 and server 104 is forwarded back and forth through mix router circuit 106. Such an encryption scheme may successfully maintain anonymity between client 102 and server 104. In should be noted that although the present example uses a mix router circuit having four mix routers, additional mix routers may be used to increase the level of anonymity.

The real-time anonymity systems discussed above are not designed to protect against certain traffic analysis attacks, such as intersection attacks. An intersection attack occurs when an attacker maps incoming packets to a mix router to outgoing packets, over multiple distinct time intervals, in order to identify the address of a particular client. This will be discussed below.

Presume that eavesdropper 108 is monitoring the packets arriving at server 104 and desires to determine the address of client 102. Further, presume that eavesdropper 108 knows that mix routers 110, 112, 114 and 116 make up mix router circuit 106 and that all data passed through mix router circuit 106 travels along a pseudo-random path. Eavesdropper 108 may ultimately determine the address of client 102 by performing a series of intersection attacks on mix routers 110, 112, 114 and 116. Eavesdropper 108 knows the source address of packets sent from the last mix router in the circuit to the server. It will perform an intersection attack to learn the address of the preceding mix router in the circuit. It can then perform an intersection attack on that mix router to find the address of the mix router that precedes that one, and so on, until it finds the address of the client.

For example, say that eavesdropper 108 performs an initial intersection attack on mix router 114. The object is to determine the source address for data received by mix router 114. In this case eavesdropper 108 will monitor via signal 128 the data 134, data 138, data 148, data 142, data 146 and data 144. The identity of the previous mix router is the source address within the data received by router 114. However, as discussed above, the data received by router 114 is encrypted to provide anonymity of the source address. To attack such anonymity, eavesdropper 128 records the incoming source addresses and outgoing destination addresses for multiple distinct time periods. This will be described in more detail below, with reference to FIG. 2.

As illustrated in the figure, it is determined that mix router 114 receives, at a first time period T1, a data packet having an origination address of s1, then receives a data packet having an origination address of s2 and then receives a data packet having an origination address of s5. Further, it is determined that mix router 114 transmits a data packet having a destination address of d1, then transmits a data packet having a destination address of d3 and then transmits a data packet having a destination address of d4.

As illustrated in the figure, it is then determined that mix router 114 receives, at a second time period T2, a data packet having an origination address of s1, then receives a data packet having an origination address of s3 and then receives a data packet having an origination address of s4. Further, it is determined that mix router 114 transmits a data packet having a destination address of d2, then transmits a data packet having a destination address of d3 and then transmits a data packet having a destination address of d5.

As illustrated in the figure, it is then determined that mix router 114 receives, at a third time period T3, a data packet having an origination address of s2, then receives a data packet having an origination address of s3 and then receives a data packet having an origination address of s5. Further, it is determined that mix router 114 transmits a data packet having a destination address of d1, then transmits a data packet having a destination address of d2 and then transmits a data packet having a destination address of d4.

As illustrated in the figure, it is then determined that mix router 114 receives, at a fourth time period T4, a data packet having an origination address of s1 and then receives a data packet having an origination address of s4. Further, it is determined that mix router 114 transmits a data packet having a destination address of d3 and then transmits a data packet having a destination address of d5.

With enough mappings, eavesdropper 128 can obtain the origination address for the previous mix router, which in this example is mix router 110. So if eavesdropper 128 desires to identify client 102, it could proceed to eavesdrop in this same manner on mix router 110, and finally on mix router 112 to identify client 102.

The discussion will now turn to the second network security challenge discussed above, data exfiltration. This will be described with reference to FIG. 3.

FIG. 3 illustrates a communication network that employs a conventional P2P anonymity system. In the figure, communication network 300 includes a client 302, a server 304, a secure network 306 and an adversary 308. A "secure" network is generally referred to as a network that encrypts application data as it traverses over the network.

Client 302 is operable to send data 310 to secure network 306 and to receive data 312 secure from network 306. Server 304 is operable to receive data 314 from secure network 306 and to send data 316 to secure network 306. In this example, data 314 corresponds to data 310 whereas data 312 corresponds to data 316, such that client 302 securely communicates with server 304.

Adversary 308 is unable to directly intercept data from secure network 306. In this example, assume there is a malicious process 318 running on client 302. Malicious process 318 has access to confidential data within client 302, and desires to transfer this data to adversary 308. Network access controls may prevent client 302 from connecting with adversary 308, even with assistance from malicious process 318. Therefore, malicious 318 process needs to find another method of sending the data. One such method is a network covert channel. Although there are multiple channels, the hardest to defeat is the packet interarrival timing channel, as will be discussed in more detail below.

When client 302 sends data 310 through secure network 306, in actuality client 302 sends a plurality of packets of bits of data. These packets of bits of data or "data packets" are arranged based on predetermined protocols, and may include specific groups of arranged data fields, non-limiting examples of which include a header, an origination address, a destination address, type of data, data payload, etc. Further, these data packets may be spaced from one another in time. This time spacing may be modulated to covertly transmit data to adversary 308.

For example, adversary 308 may eavesdrop on a link within secure network 306. Presume in this example that adversary 308 is unable to directly access or interpret the data within secure network 306 as a result of the encryption system within secure network 306. In any event as data packets pass through the monitored link, adversary 308 merely monitors the timing differences between the data packets. Now, presume that malicious process 318 has modulated the timing of the data packets, without even changing the data within the data packets. In this manner, the modulated timing differences between the packets are used to encode bits of information, which adversary 308 detects. As such, malicious process 318 is able to exfiltrate data from client 302 to adversary 308, even in the face of a secure network.

In the above discussed example, the detection task of adversary 308 is made much easier if there are some packet characteristics that can be used to filter out other traffic, such as a constant source and/or destination address. A defense against data exfiltration helps to serve as an additional defensive layer against host and application vulnerabilities, since an attacker will be unable to leak confidential data in a timely manner. Thus it is needed to maintain information, including location, privacy for a fixed period of time, in the presence of Trojan horses (a class of computer threats that appears to perform a desirable function but in fact performs undisclosed malicious functions that allow unauthorized access to the host machine) on the protected host or network.

Since there is no proven effective solution for network anonymity problem and data exfiltration problem discussed above, network users are not secure enough due to the leak of confidential information while accessing network.

What is needed is a solution that can ensure anonymous communications and prevent data exfiltration from a network.

BRIEF SUMMARY

It is an object of the present invention to provide a system and method that increases anonymity and decreases the likelihood of data exfiltration from a network.

In accordance with an aspect of the present invention, a method is provided for sending a data packet from a client through a network and to a server. The data packet is a data structure having an originating address portion and destination address portion. The network includes a first mix router and a second mix router. The client has a client address, whereas the first mix router has a first mix router address, the second mix router has a second mix router address and the server has a server address. The method includes encrypting the originating address portion of the data packet and encrypting the destination portion of the data packet, transmitting the encrypted data packet, decrypting the originating address portion of the encrypted data packet and the destination portion of the encrypted data packet, providing a first data packet and providing a second data packet. Specifically, the encrypting the originating address portion of the data packet is based on the client address and the encrypting the destination portion of the data packet is based on one of the first mix router address and the second mix router address. The encrypting generates an encrypted data packet. The encrypted data packet is transmitted to the one of the first mix router and the second mix router, wherein it is decrypted to generate a decrypted data packet. The first data packet is based on the decrypted data packet and is provided to the other of the first mix router and the second mix router. The second data packet is provided to the server.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
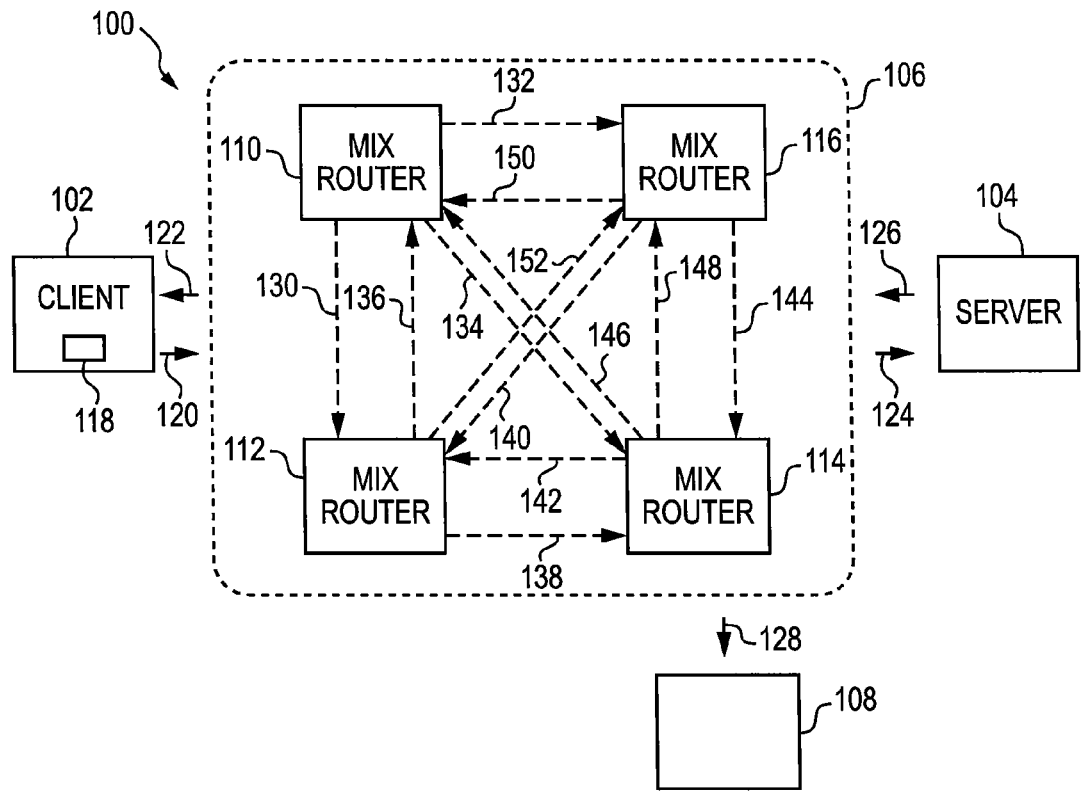
FIG. 1 illustrates a communication network that employs a conventional P2P anonymity system.

In accordance with an aspect of the present invention, an address encryption scheme decreases the likelihood of traffic analysis, increases anonymity and decreases the likelihood data exfiltration from a network.

An address encryption scheme in accordance with an aspect of the present invention leverages a mix router anonymity system, for example as discussed above. In an example embodiment, the plaintext addresses of the mix routers, within a mix router circuit, are encrypted with symmetric keys. A symmetric key is a high-entropy bit string that is known to both the server and the client. The input to the encryption includes a pseudorandom value; thus each packet sent to one of the mix routers has a one-time encrypted destination address. Further, a global prefix identifier may be left in the clear to facilitate forwarding by core routers, which are not modified.

A system and method in accordance with an aspect of the present invention contrasts with a conventional prefix encryption scheme as discussed above, which is less reliable under traffic analysis attacks, because the conventional scheme enables forwarding of packets with encrypted addresses where only access routers need to be modified.

Therefore, in accordance with an aspect of the present invention, traffic analysis attacks (especially intersection attacks) are more difficult since the location of mix routers are more difficult to ascertain. For the purpose of further defending against traffic analysis attacks, it is important to make packets appear as pseudorandom as possible. Mix router encryption solves this problem for the packet fields other than the network header, as will be described in more detail below. Thus the network addresses in the conventional methods discussed above are the main elements that leak information. The conventional address encryption scheme described above solves the problem for the destination address, with the exception of a global prefix identifier.

However, source addresses also leak information. It is this problem that the conventional encryption scheme described above fails to address, and that address encryption scheme in accordance with the present invention addresses. Specifically, in accordance with an aspect of the present invention pseudorandom source addresses are generated to decrease the likelihood of information leaks.

An issue with using pseudo-random source addresses is that the source address is used as an index for decryption and processing of an incoming packet. Thus in accordance with another aspect of the present invention a client may periodically send a list of source addresses to a receiving server. This list may be encrypted by known methods, non-limiting examples of which include a public key encryption and a symmetric key encryption. In an example embodiment, the initial list can be public key encrypted, whereas later lists can be encrypted with a symmetric key. In another example embodiment, a shared secret key may be used between a sender and a receiver to generate the pseudo-random source addresses using a pseudo-random generator. In other words, using a pseudo-random generator replaces sending a list of source addresses to the receiver. The shared secret key can be sent in the initial public key encrypted message between the sender and the receiver.

Now consider packets flowing into a destination network of interest for example network 100 of FIG. 1. Eavesdropper 108 may wish to eavesdrop in order to detect and read a channel from mix router 114. In accordance with an aspect of the present invention, wherein the origination addresses are additionally encrypted, the incoming packets all appear to be unrelated. Further, all of the remaining traffic functions as "cover traffic," i.e., additional noise packets intended to defeat traffic analysis, relative to the traffic of interest. If the number of packet flows is more than a small number, the channel becomes very noisy. However, as the quantity of cover traffic is increased, the amount of time needed to read information becomes longer.

An example application of an address encryption scheme in accordance with an aspect of the present invention will now be described.

Consider a Mobile Ad-hoc NETwork (MANET) that desires to maintain location privacy as well as maintain confidentiality of its data. The MANET will need to communicate with its home network yet maintain its privacy from an adversary. Assuming that the MANET gateways are uncompromised, then the MANET can trust that network access controls are being enforced. Thus Trojan horse software or hardware, i.e., malware, on MANET nodes cannot directly send data to an adversary host. The malware will instead attempt to send the data via network covert channels, as discussed above.

Using an address encryption scheme in accordance with an aspect of the present invention can minimize successful data exfiltration via covert channels. If the MANET location remains private, then the adversary cannot eavesdrop on traffic as it is sent out from the MANET. Eavesdropping on links close to the MANET could enable an adversary to detect and read channels, if the amount of traffic is not large. Alternatively, if these close to the MANET links use link-level traffic padding, i.e., noise packets, then the adversary will not be able to easily exploit channels even if the location is known. For the MANET case, the application of an address encryption scheme in accordance with an aspect of the present invention is primarily interested in channels that leak MANET data, i.e., traffic flowing outbound from the MANET.

A working embodiment of the present invention was implemented using Internet Protocol version 6 (IPv6), which is the next-generation internet layer Internet protocol for packet-switched internetworks and the internet. Internet Protocol version 4 (IPv4) is currently the dominant internet protocol version, and was the first to receive widespread use. However, IPv6 provides a 128-bit address for a data packet, whereas Ipv4 provides only a 32-bit address space for a data packet. The longer address space In IPv6 enables much stronger security than that provided by IPv4.

An address encryption scheme in accordance with an aspect of the present invention will now be described with reference to FIGS. 4 and 5.

Figure 4:
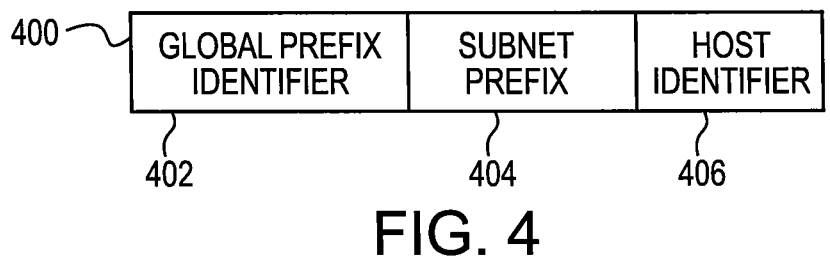
FIG. 4 illustrates a IPv6 address structure using a Cryptographically Protected Prefix (CPP)

FIG. 4 illustrates a IPv6 address structure using a Cryptographically Protected Prefix (CPP). As illustrated in the figure, data packet 400 is a data structure comprising a string of bits, wherein the data structure is arranged into portions includes a global prefix identifier 402, a subnet prefix 404, and a host identifier 406.

Generally, global prefixes are distributed to the companies or to end users by Internet Service Providers (ISPs). Global prefix identifier 402 is used for a core router forwarding algorithm in CPP. Subnet prefix 404 represents the network to which the interface is connected and a local identifier, sometimes called a token. Subnet prefix 404 is used for an access router forwarding algorithm in CPP. Host identifier 406 is used to identify the host on the network.

With CPP, host identifier 406 is a random value; host identifier 406 and plaintext subnet prefix 404 are inputs into an encryption algorithm which outputs the encrypted subnet prefix. The global prefix identifier 406 is not modified.

The address encryption scheme in accordance with present invention extends address encryption scheme in CPP in order to create One-Time Addresses (OTA). The purpose of using OTA is to make traffic analysis much more difficult for eavesdroppers and compromised routers. A block diagram of OTA is given in FIG. 5.

Figure 5:
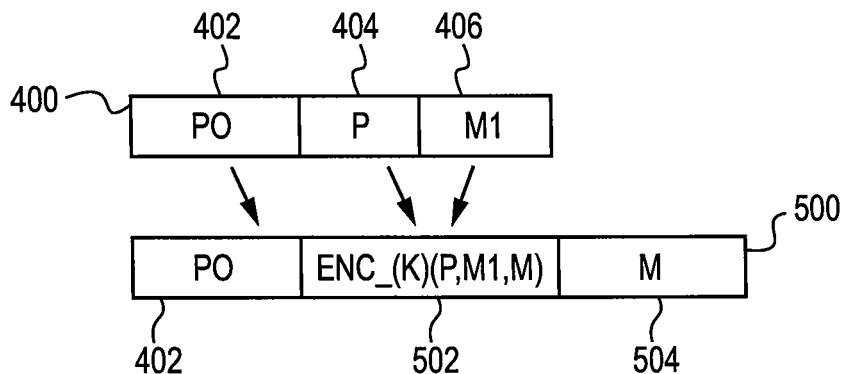
FIG. 5 illustrates an example structure of a OTA used in IPv6 in accordance with an aspect of the present invention with the IPv6 address structure using a CPP illustrated in FIG. 4.

FIG. 5 illustrates an example structure of a OTA used in IPv6 in accordance with an aspect of the present invention with the IPv6 address structure using a CPP illustrated in FIG. 4. As illustrated in the figure, OTA data packet 500 is a data structure comprising a string of bits, wherein the data structure is arranged into portions including a global prefix identifier 402, an encrypted code portion 502 and a pseudo-randomly generated value portion 504.

It is clear that OTA data packet 500 retains global prefix identifier 402 from data packet 400 illustrated in FIG. 4. Encrypted code portion 502 however is cryptographically generated based on subnet prefix 404 and host identifier 406 from data packet 400 illustrated in FIG. 4 and additionally based on a pseudo-randomly generated value M. In an example embodiment pseudo-randomly generated value M has a bit-length of 48 bits and is generated first. Then address encryption, e.g., via CPP, is applied pseudo-randomly generated value M as the new host identifier. Further, the encrypted value based on subnet prefix 404, host identifier 406 and pseudo-randomly generated value M is the new subnet prefix. In an example embodiment, the plaintext host identifier, M1, is concatenated with the plaintext subnet prefix P, using the CPP encryption algorithm (P concatenated with M1 is used in place of P in CPP encryption), and the pseudorandom value M is used in place of the host identifier M in CPP encryption. Other variations are possible as well.

A key point here is that pseudo-randomly generated value portion 504 is a one-time value. As such, the destination address is distinct for every packet even though the global identifier is constant. Thus many OTA's all decrypt to a single constant plaintext address. One should note that a small number of bits of the global prefix identifier 404 may be needed to identify this special type of IPv6 address for purposes of interoperability.

Although not shown, subnet prefix 404 may require at least one key version bit as a separate field in the address. Further, some host transport protocols, e.g., TCP, require fixed endpoint addresses. A system in accordance with an aspect of the present invention avoids this issue because OTA's are handled by mix routers and other devices for which network stack modification is practical.

As discussed above, OTA is sufficient to randomize destination addresses, but source addresses also serve to identify particular network flows. In accordance with an aspect of the present invention source addresses are randomized by pseudo-randomly generating the source addresses. There are some issues with this approach that are additionally addressed in accordance with an aspect of the present invention, as discussed below.

A first issue with pseudo-randomly generating source addresses is that source addresses are used as an index for selecting decryption keys. In accordance with one aspect of the present invention, one solution to this issue includes providing the future source addresses to a recipient in periodic encrypted control packets, which may have been encrypted by any known method. In one example, the first periodic encrypted control packet may include a public key encrypted packet. A second solution to this issue includes generating pseudorandom addresses on both sides using any known random seed method.

A second issue with pseudo-randomly generating source addresses deals with collisions between source addresses. However, the IPv6 address contains enough bits (128 bits) to decrease the likelihood of collisions to the point where collisions will rarely occur.

In order to demonstrate how the address encryption scheme in accordance with an aspect of the present invention improves the network security, a mix router anonymity system using an OTA encryption scheme will now be described with reference to FIG. 6.

Figure 6:
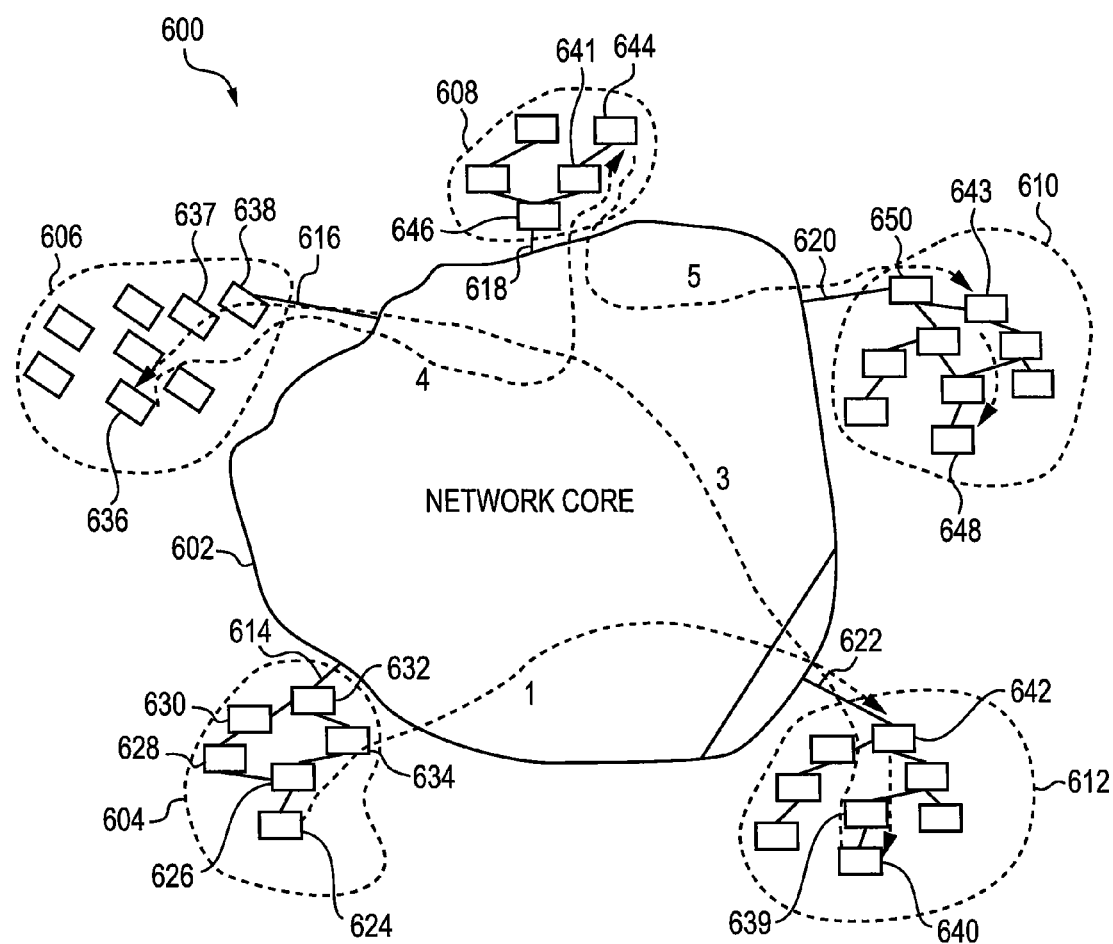
FIG. 6 illustrates a One Time Address (OTA) integration with a real-time mix router anonymity system in accordance with an aspect of the present invention.

FIG. 6 illustrates an OTA integration with a real-time mix router anonymity system. As illustrated in the figure, system 600 includes a network core 602, networks 604, 606, 608, 610, and 612. Networks 604, 606, 608, 610, and 612 are connected to network core 602 via network backbones 614, 616, 618, 620, and 622, respectively.

Each of networks 604, 606, 608, 610, and 612 includes a plurality of devices, non-limiting examples of which include computers, printers, routers, etc., each of which has an individual IP address. For example, network 606 includes computers 624, 626, 628, and 630, a translation device 634 as will be explained in more detail below, and a border router 632, as will be explained in more detail below. Network 606 includes a translation device 637, a mix router 636 and a border router 638. Network 612 includes a translation device 639, a mix router 640 and a border router 642. Network 608 includes a translation device 641, a mix router 644 and a border router 646. Network 610 includes a translation device 643, a computer 648 and a border router 650.

Each of the devices depicted in FIG. 6 may be any known type of data processing system that is operable to perform functions. These functions may be performed based on instructions that may be stored each device, respectively, or may be stored on a data processing system readable medium that is accessible by each device, respectively.

Each of translation devices 634, 637, 639, 641 and 643 is operable to perform an initial encryption of data packets, for example as a Tor client would, in addition to encrypting the destination address and generating a random source address. Each of translation devices 634, 637, 639, 641 and 643 is further operable to receive packets and translate the encryption of the destination address to the local keys of its respective network.

Border routers 632, 638, 642, 646 and 650 are associated with translation devices 634, 637, 639, 641 and 643, respectively.

For purposes of discussion, in this example, computer 624 in network 604 is communicating with a computer 648 in network 610. In this example, computer 624 is a client, whereas computer 642 is a server. An example communication process from computer 624 to computer 642 in accordance with an aspect of the present invention will now be described in greater detail, with additional reference to FIG. 7.

Figure 7:
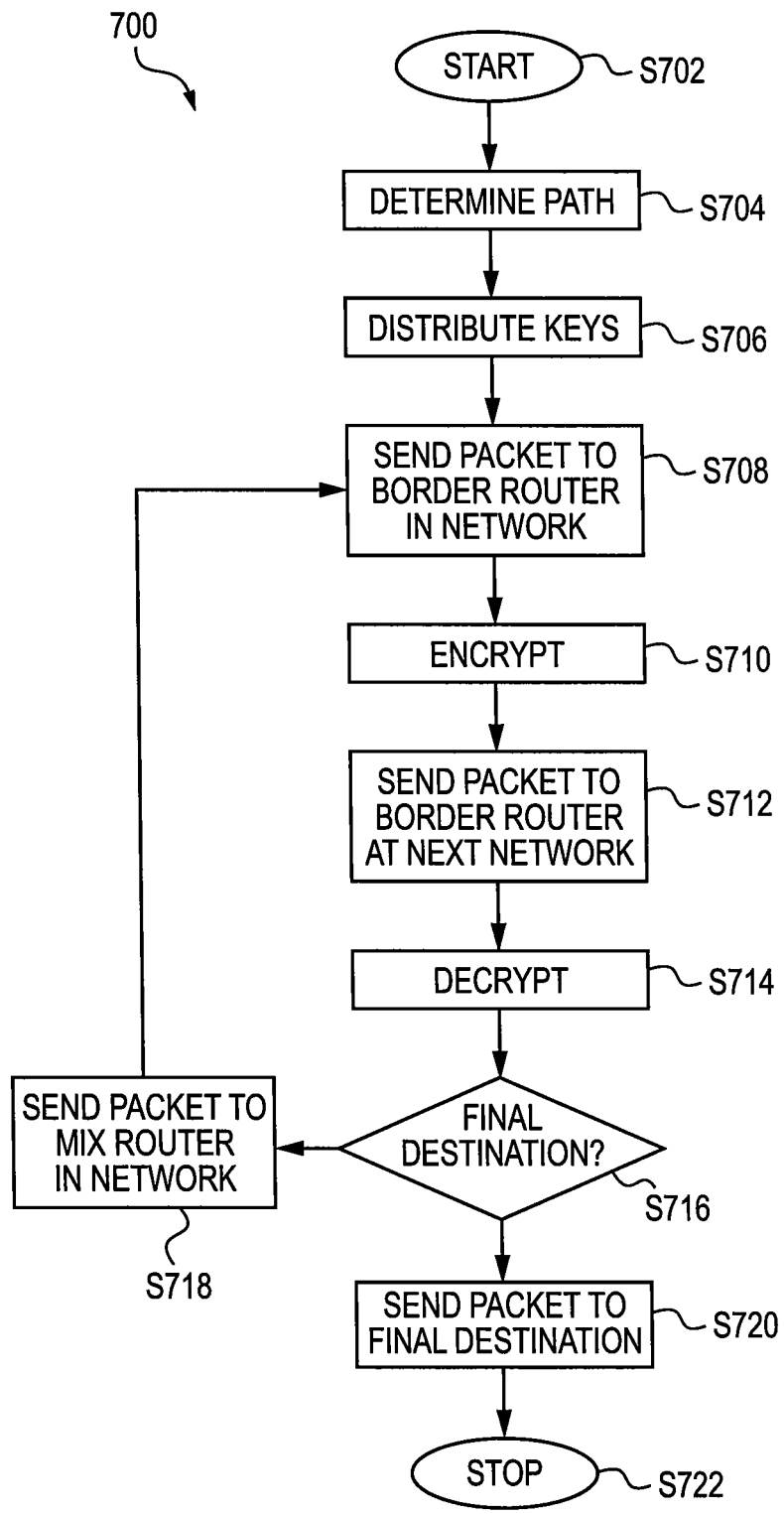
FIG. 7 is a flow chart illustrating an example method 700 of communicating between a client and a server in a network that includes a plurality of mix routers in accordance with an aspect of the present invention.

FIG. 7 is a flow chart illustrating an example method 700 of communicating between a client and a server in a network that includes a plurality of mix routers in accordance with an aspect of the present invention.

After method 700 starts (S702) a communication path is determined (S702). This determination may be performed by any known method, non-limiting examples of which include a predetermined static communication path, a dynamically changing communication path and a pseudo-randomly determined path. Presume in this example that the pseudo-randomly generated communication path from client 624 starts at network 604, traverses on a first leg to network 612, traverses on a second leg to network 606, traverses on a third leg to network 608 and finally ends at network 610. The establishment of the mix router circuit for the upcoming application session (multiple application sessions can be multiplexed over a single circuit) may follow the approach in the Tor mix router anonymity system.

Once the communication path is determined, in one embodiment, translation device 634 sends future source addresses to mix router 640 in periodic encrypted control packets (S706). In another embodiment, translation device 634 sends a shared secret seed for generating pseudo-random source addresses. As such, the translation device in each of border routers 632, 638, 642, 646 and 650 will be able to decrypt the originating address and the following destination address for each received packet, as will be described in more detail below.

Then, client 624 begins sending its packets of data to computer 648. Translation device 634 intercepts these packets before they exit network 604. Translation device 634 encrypts these packets in a manner similar to Tor. In accordance with the present invention, translation device 634 another encrypts the packets such that they have a pseudo-random source address and an encrypted plaintext address of mix router 640 of network 612 as the destination address in a manner as discussed above with respect to FIG. 5 (S710).

The packet is then forwarded to border router 642 via backbone 632, network core 602 and backbone 622 (S712). Here, border router 642 offloads the packets to translation device 639. Translation device 639 is able to locate a decryption key based on the pseudo-randomly generated source address (S714). Translation device 639 then decrypts the destination address and re-encrypts it using the keys for network 612. For example, for a hierarchical encryption scheme such as CPP, the keys are assigned based on the access router's depth in the routing graph.

At this point, and based at least on the routing graph, it is determined that network 612 is not the final destination of the packet (S716). Translation device 639 then forwards the data packet to mix router 640 (S718).

Mix router 640 knows that the data packet has been predetermined to travel along a specific pseudo-randomly determined path, and that the next leg of the path is to mix router 636 of network 606. Mix router 640 forwards the data packet to mix router 636 (S708). Here, mix router 640 selects the next random source address of the data packet to hide the identity of the source, which in this case is mix router 640 (S710). Further, mix router 640 additionally encrypts the plaintext destination address of the data packet to hide the identity of the destination, which in this case is mix router 636. Mix router 640 also performs conventional mix router operations such as decrypting a layer of the inner packet.

After encryption, mix router 640 forwards the data packet to border router 638 via backbone 622, network core 602 and backbone 616 (S712). Here, translation device 637 is able to locate a decryption key based on the pseudo-randomly generated source address (S714).

After decryption, translation device 637 is able to re-encrypt the destination address in the keys of network 606 as described above for translation device 639. It is determined that network 606 is not the final destination of the packet (S716). Translation device 637 then forwards the data packet to mix router 636 (S718).

Mix router 636 knows that the data packet has been predetermined to travel along a specific pseudo-randomly determined path, and that the next leg of the path is to mix router 644 of network 608. Mix router 636 forwards the data packet to mix router 644 (S708). Here, mix router 636 selects the next source address of the data packet to hide the identity of the source, which in this case is mix router 636 (S710). Further, mix router 636 additionally encrypts the plaintext destination address of the data packet to hide the identity of the destination, which in this case is mix router 644. Mix router 636 also performs conventional mix router operations such as decrypting a layer of the inner packet.

After encryption, mix router 636 forwards the data packet to mix router 644 via backbone 616, network core 602 and backbone 618 (S712). Here, translation device 641 is able to locate a decryption key based on the pseudo-randomly generated source address (S714).

After decryption, translation device 641 is able to re-encrypt the destination address in the keys of network 608 as described above for translation device 634. Again, it is determined that network 608 is not the final destination of the packet (S716). Translation device 641 then forwards the data packet to mix router 644 (S718).

Mix router 644 knows that the data packet has been predetermined to travel along a specific pseudo-randomly determined path, and that the next leg of the path is to server 648 of network 610. Mix router 644 forwards the data packet to server 648. Here, mix router 644 selects the next source address of the data packet to hide the identity of the source, which in this case is mix router 644. Further, mix router 644 additionally encrypts the plaintext destination address of the data packet to hide the identity of the destination, which in this case is server 648. Mix router 644 also performs conventional mix router operations such as decrypting a layer of the inner packet.

After encryption, mix router 644 forwards the data packet to mix server 648 via backbone 618, network core 602 and backbone 620 (S712). Here, translation device 643 is able to locate a decryption key based on the pseudo-randomly generated source address (S714).

After decryption, translation device 643 is able to re-encrypt the destination address in the keys of network 610 as described above for translation device 634. Here, it is determined that network 610 is the final destination of the packet (S716). Translation device 643 then forwards the data packet to server 648 (S720) and the process is complete (S722).

Method 700 may be performed within system 600 via hardware or software. That is, with respect to hardware, any of the devices within system 600 may be hard-wired to perform any number of specific functions, e.g., encrypting, decrypting, sending data packets, receiving data packets, etc. Similarly, with respect to software, any of the devices within system 600 may be to perform any number of specific functions, e.g., encrypting, decrypting, sending data packets, receiving data packets, etc., based on a reading of instructions from a media having device readable instructions stored thereon. Further, method 700 may be performed within system 600 via a mix of hardware and software, wherein a number of the devices within system 600 may be hard wired to perform any number of specific functions and the remaining devices within system 600 perform any number of specific functions based on a reading of instructions form a media having device readable instructions stored thereon.

Figure 2:
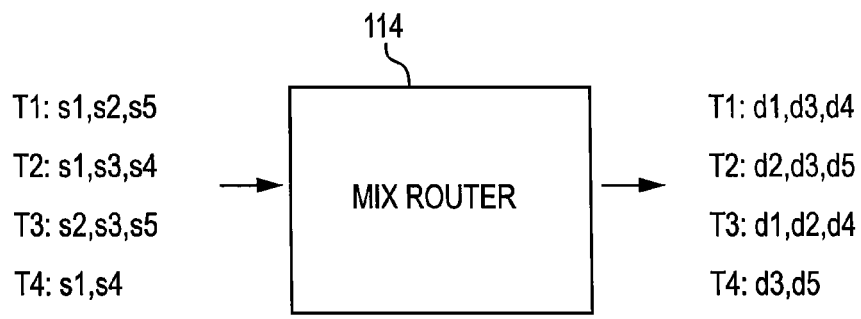
FIG. 2 illustrates conventional incoming source addresses and outgoing destination addresses in a mix router for multiple distinct time periods.

Suppose that a computer 652 in network 608 is a computer that is trying to eavesdrop on information from client 624 to server 648. Computer 652 may initiate an intersection attack on mix router 646, in hopes to find the next mixed router in the pseudo-randomly determined communication path. Referring back to FIG. 2, computer 652 may monitor data packets into mix router 646 and data packets out of mix router 646. However, in accordance with the encryption scheme of the present invention, the origination addresses and the destination addresses for the packets are pseudo-randomly generated.

Therefore, in order for the intersection attack to be successful, computer 652 must first recognize that the origination addresses and the destination addresses are encrypted. Then, if computer 652 is able to recognize the encryption, computer 652 must be able to determine the decrypted origination address of packets into mix router 646, e.g., the decrypted address corresponding to mix router 638. These two additional levels of security in accordance with an aspect of the present invention greatly reduce the success rate of intersection attacks.

Figure 3:
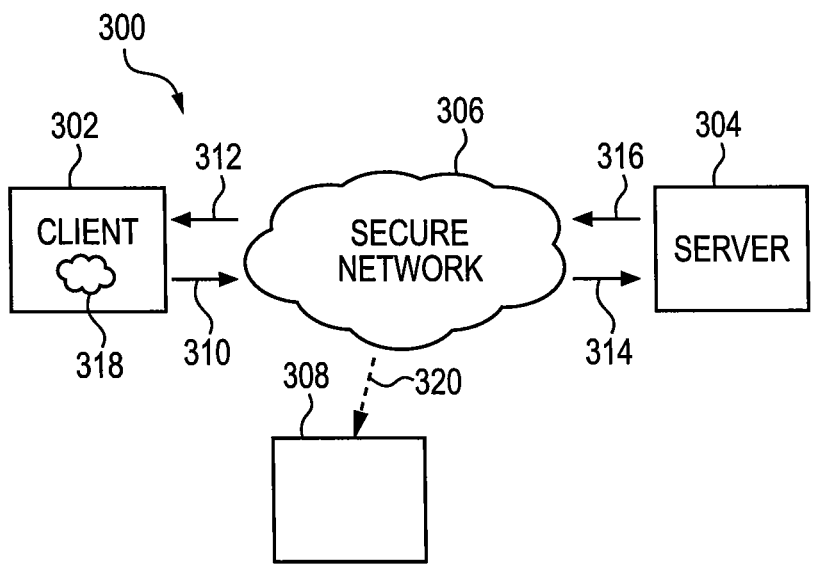
FIG. 3 illustrates a communication network that employs a conventional P2P anonymity system.

Now suppose that computer 652 in network 608 is unable to directly intercept a communication from border router 646. But, suppose that border router 646 has a malicious process therein that is designed to covertly communicate to computer 652 via modulating the interarrivial timing of packets into and out of border router 646. Referring back to FIG. 3, computer 652 may monitor data packets into border router 646 and data packets out of border router 646. However, in accordance with the encryption scheme of the present invention, the source addresses and the destination addresses for the packets are pseudo-randomly generated.

Therefore, in order for the covert communication to be successful, the malicious process on border router 646 must first recognize that the origination addresses and the destination addresses are encrypted. This additional level of security in accordance with an aspect of the present invention greatly reduces the success rate of covert communication via modulating the interarrivial timing of packets.

An address encryption scheme in accordance with an aspect of the present invention is also applicable for a MANET application. Initial analysis suggests that as the amount of traffic grows beyond a small amount between certain pairs of access networks, then network covert channels become very noisy. Suppose MANET traffic is forwarded through a mix router anonymity system as described in the following example.

First, all MANET traffic initially flows to one of many small access networks or so called "collection networks." Second, all traffic from this collection network flows to a larger access network with mix routers, e.g., about a hundred or so of these mix router access networks. Enough traffic flows between every pair of these networks such that channels between these networks become very noisy. Third, traffic flows through the mix routers which may be located in distinct mix router access networks. Finally, the last mix router forwards the traffic to the destination (home) network.

With above scenario, there may have various eavesdropping points on the network links for MANET application. Such points include: points in the destination network; on links feeding into the destination network; on links emanating from a mix router access network; within mix router access networks; and on links closer to the MANET.

If eavesdropping points are located in the destination network, these links are assumed to be secure against eavesdroppers. Alternatively, if the nodes on the destination network are not confederates of the adversary, and thus randomizing packets on the internal links, one could tunnel encrypt packets on each link. The lowest links may still be vulnerable due to limited quantity of traffic in this case. In particular, the network will trust the server and routers near the server. A third option is a hierarchical address encryption scheme such as CPP that reduces trust in the destination network nodes.

If eavesdropping points are located on links feeding into the destination network, then more than a small number of packet flows will make channels noisy because the address encryption scheme of present invention uses random source addresses. Therefore, it is very difficult for the adversary to detect and read a channel.

If eavesdropping points are located on links emanating from a mix router access network, one can assume there are either no flows or more than a small number of flows destined for any given destination network. If needed, a small amount of cover traffic can be created. Further, there is enough traffic between the mix router access networks to obscure those channels.

If eavesdropping points are located within mix router access networks, eavesdropping on lower links represents a low probability success guess on the part of the adversary. Higher links are obscured based on the same argument as for the destination network internal links.

If eavesdropping points are located on links closer to the MANET, many factors contribute to obscuring the channels. Since there is a combination of location privacy and/or link padding at eavesdropping points, the large number of collection networks, and the fact that all traffic from a given collection network flows to a single mix router access network will obscure the channels.

An address encryption scheme in accordance with the present invention enables OTA. In addition, source addresses are randomized, and destination addresses use a one-time encryption scheme which effectively randomizes the destination address except for the global prefix identifier (thus core routers do not have to be modified). Randomized addresses makes it difficult for an adversary to determine which packets belong to which network flows. Thus packets from other network flows act as cover traffic for a given network flow. Thus the channel that depends on packet interarrival times will become extremely noisy, since the adversary cannot distinguish which packets belong to which flows. A noisy packet count channel is likely to be the optimal adversary strategy in this situation.

Aspects of the present invention may be implemented in a mix router anonymity system, but obtains additional benefits if the mix routers are located in access networks that support a hierarchical address encryption scheme.

The conventional solution uses link encryption or tunnel-encrypts packets on links. This solution provides some benefit against network eavesdroppers. However, this conventional solution has at least two deficiencies, when compared to the scheme of present invention. First, the conventional solution requires encryption by core routers, which is expensive. Second, the conventional solution requires trust in all the routers along the path, which is not realistic. An aspect in accordance with the present invention does not require trusting all the intermediate routers.

Another aspect of the present invention addresses the situation when an adversary is physically close to a wireless network which contains the data exfiltrating node. In such a situation there may not be sufficient additional traffic to hide the network covert channels. In this case, in accordance with another aspect of the present invention, different technique may be used to prevent exfiltration.

Spreading code keys may be for the wireless communications. Wireless nodes use a frequency hopping technique, which is determined by the spreading code key. The spreading code key is used to key a pseudorandom function which outputs the sequence of frequencies. In accordance with an aspect of the present invention, the spreading code key could be a shared symmetric encryption key between the sender and receiver. In such a case, the adversary will miss many of the packet transmissions, since they won't know which frequency to monitor. Further, the adversary would not have access to the spreading code key, and therefore would not know which frequency to monitor next. Accordingly, there will be substantial noise added into the channels from which a compromised application or host may attempt to exfiltrate the data.

Furthermore, these pairwise (or group) encryption keys can be set up by using identity based non-interactive key agreement protocols. In some cases, these protocols will not require any additional messages, or will only need to send a single message, before the communicating parties are able to compute the spreading code key.

As discussed above an aspect of the present invention includes generating source addresses between two entities off of a shared secret seed value.

Further, in accordance with an aspect of the present invention, a multilevel encryption scheme is employed along a mix router circuit having a plurality of mix routers. For example, mix router may send an encrypted list of source addresses to the mix router on the circuit.

Still further, in accordance with an aspect of the present invention, separate translation devices may be used to translate encrypted addresses into re-encrypted addresses via encryption keys of the local network. The advantage is that border routers may be processing a lot of traffic, which may act as further noise to cover the encrypted packets. Also, it may be beneficial to distrust the border routers with the encryption keys. In some embodiments, the translation devices might be separate hardware units within the border routers.

One key point is that the client host will hardly ever be trusted. Thus the initial encryptions, setup of the mix router circuit, etc., should occur on the client network translation device.

In accordance with aspects of the present invention, any known encryption algorithm may be used to encrypt a source address and a destination address within a data packet. Further, in accordance with aspects of the present invention discussed above, any reference to "pseudo-random" or "pseudo-randomly" is includes any known algorithm that is capable of generating a pseudo-random outcome.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modi-

What is claimed as new and desired to be protected by Letters Patent of the United States is:

1. A method of processing packets sent through a selectable multi-leg path of a communication network, comprising:
  receiving encryption keys at first and second packet processing systems (PPSs) of the communication network, wherein the encryption keys are associated with other PPSs of the communication network;
  receiving key association information at the first and second PPSs to associate the encryption keys with the corresponding PPSs;
  at the first PPS, intercepting a packet from a packet originator, encrypting a destination address of the intercepted packet based on the encryption key of the first PPS, modifying a source address of the intercepted data packet based on a first pseudo-random value, and forwarding the intercepted packet in the first path after the encrypting and modifying at the first PPS; and
  at the second PPS, receiving the packet from the first PPS, selecting the encryption key of the first PPS based on the received key association information and the source address of the received packet, decrypting a next destination address of the received packet based on the selected encryption key, encrypting the decrypted next destination address based on the encryption key of the second PPS, modifying the source address of the received data packet based on a second pseudo-random value to render the source address of the received packet a one-time-use source address, and forwarding the received packet in the first path after the encrypting and modifying at the second PPS.

2. The method of claim 1, wherein the first and second PPS each include one or more of a network address translation device and a router.

3. The method of claim 1, further including:
  configuring the second PPS as a source of a first leg of another path of the communication network; and
  configuring the first PPS as a destination of the first leg of the other path, and as a source of a second leg of the other path.

4. The method of claim 1, wherein:
  the modifying at the first PPS includes replacing the source address of the intercepted packet with the first pseudo-random value; and
  the modifying at the second PPS includes replacing the source address of the received packet with the second pseudo-random value.

5. The method of claim 1, further including:
  generating a set of pseudo-random values at the first PPS; and
  providing the set of pseudo-random values to the other PPSs as key association information;
  wherein the modifying at the first PPS includes modifying the source address of the intercepted packet based on a first pseudo-random value of the set; and
  wherein the modifying at the second PPS includes modifying the source address of the received packet based on a second pseudo-random value of the set.

6. The method of claim 1, further including:
  generating the first pseudo-random value based on a seed value;
  providing the seed value to the other PPSs as the key association information; and
  generating the second pseudo-random value at the second PPS based on the seed value.

7. The method of claim 1, further including:
  modifying at least a portion of the destination address of the intercepted packet at the first PPS based on a third pseudo-random value; and
  modifying at least a portion of the modified destination address of the received packet at the second PPS based on a fourth pseudo-random value to render the modified destination address of the received packet a one-time-use destination address.

8. The method of claim 7, wherein:
  the encrypting at the first PPS includes,
    encrypting a combination of a third pseudo-random value, a subnet prefix of the destination address of the intercepted packet, and a host identifier of the destination address of the intercepted packet, and
    replacing the subnet prefix of the intercepted packet with the corresponding encrypted combination; and
  the encrypting at the second PPS includes,
    encrypting a combination of a fourth pseudo-random value, a subnet prefix of the destination address of the received packet, and a host identifier of the destination address of the received packet, and
    replacing the subnet prefix of the received packet with the corresponding encrypted combination to render the destination address of the received packet a one-time-use destination address.

9. The method of claim 8, wherein:
  the encrypting at the first PPS further includes replacing the host identifier of the intercepted packet with the third pseudo-random value; and
  the encrypting at the second PPS further includes replacing the host identifier of the received packet with the fourth pseudo-random value.

10. A system to process packets sent through a selectable multi-leg path of a communication network, comprising:
  first and second packet processing systems (PPSs), each to receive encryption keys associated with other PPSs of the communication network, and to receive key association information to associate the encryption keys with the corresponding PPSs;
  wherein the first PPS is configurable as a source of a first leg of a first path to intercept a packet from a packet originator, encrypt a destination address of the intercepted packet based on the encryption key of the first PPS, modify a source address of the intercepted data packet based on a first pseudo-random value, and forward the intercepted packet in the first path after address encryption and modification; and
  wherein the second PPS is configurable as a destination of the first leg to receive the packet from the first PPS, select the encryption key of the first PPS based on the received key association information and the value in the source address field of the received packet, decrypt a next destination address of the received packet based on the selected encryption key, encrypt the decrypted next destination address based on the encryption key of the second PPS, modify the source address of the received data packet based on a second pseudo-random value to render the source address of the received packet a one-time-use source address, and forward the received packet in the first path after address encryption and modification.

11. The system of claim 10, wherein the first and second PPS each include one or more of a network address translation device and a router.

12. The system of claim 10, wherein:
the second PPS is further configurable as a source of a first leg of another path of the communication network; and
the first PPS is further configurable as a destination of the first leg of the other path, and as a source of a second leg of the other path.

13. The system of claim 10, wherein the first PPS is configured to replace the source address of the intercepted packet with the first pseudo-random value, and the second PPS is configured to replace the source address of the received packet with the second pseudo-random value.

14. The system of claim 10, wherein:
the first PPS is configured to:
generate a set of pseudo-random values,
provide the set of pseudo-random values to the other PPSs as key association information, and
modify the source address of the intercepted packet based on a first pseudo-random value of the set; and
the second PPS is configured to modify the source address field of the received packet based on a second pseudo-random value of the set.

15. The system of claim 10, wherein:
the first PPS is configured to generate the first pseudo-random value based on a seed value, and provide the seed value to the other PPSs as the key association information; and
the second PPS is configured to generate the second pseudo-random value based on the seed value.

16. The system of claim 10, wherein:
the first PPS is configured to modify at least a portion of the destination address of the intercepted packet based on a third pseudo-random value, and
the second PPS is configured to modify at least a portion of the modified destination address of the received packet based on a fourth pseudo-random value to render the modified destination address of the received packet a one-time-use destination address.

17. The system of claim 16, wherein:
the first PPS is configured to,
encrypt a combination of a third pseudo-random value, a subnet prefix of the destination address of the intercepted packet, and a host identifier of the destination address of the intercepted packet, and
replace the subnet prefix of the intercepted packet with the corresponding encrypted combination; and
the second PPS is configured,
encrypt a combination of a fourth pseudo-random value, a subnet prefix of the destination address of the received packet, and a host identifier of the destination address of the received packet, and
replace the subnet prefix of the received packet with the corresponding encrypted combination to render the destination address of the received packet a one-time-use destination address.

18. The system of claim 17, wherein:
the first PPS is further configured to replace the host identifier of the intercepted packet with the third pseudo-random value; and
the second PPS is further configured to replace the host identifier of the received packet with the fourth pseudo-random value.

19. Non-transitory computer readable mediums encoded with computer programs to process packet sent through a selectable multi-leg path of a communication network, comprising:
instructions to cause each of first and second packet processing systems (PPSs) to receive encryption keys associated with other PPSs of the communication network;
instructions to cause each of the first and second PPSs to receive key association information to associate the encryption keys with the corresponding PPSs;
instructions to cause the first PPS to intercept a packet from a packet originator, encrypt a destination address of the intercepted packet based on the encryption key of the first PPS, modify a source address of the intercepted data packet based on a first pseudo-random value, and forward the intercepted packet in the first path after encryption and modification by the first PPS; and
instructions to cause the second PPS to receive the packet from the first PPS, select the encryption key of the first PPS based on the received key association information and the source address of the received packet, decrypt a next destination address of the received packet based on the selected encryption key, encrypt the decrypted next destination address based on the encryption key of the second PPS, modify the source address of the received data packet based on a second pseudo-random value to render the source address of the received packet a one-time-use source address, and forward the received packet in the first path after the encrypting and modifying by the second PPS.

20. The non-transitory computer readable mediums of claim 19, further including:
instructions to cause the first PPS to,
encrypt a combination of a third pseudo-random value, a subnet prefix of the destination address of the intercepted packet, and a host identifier of the destination address of the intercepted packet, and
replace the subnet prefix of the intercepted packet with the corresponding encrypted combination; and
instructions to cause the second PPS to,
encrypt a combination of a fourth pseudo-random value, a subnet prefix of the destination address of the received packet, and a host identifier of the destination address of the received packet, and
replace the subnet prefix of the received packet with the corresponding encrypted combination to render the destination address of the received packet a one-time-use destination address.

* * * * *